United States Patent [19]
Ishikawa

[11] Patent Number: 4,626,062
[45] Date of Patent: Dec. 2, 1986

[54] LIGHT BEAM SCANNING APPARATUS
[75] Inventor: Hiromi Ishikawa, Kanagawa, Japan
[73] Assignee: Fuji Photo Film Co., Ltd., Kanagawa, Japan
[21] Appl. No.: 574,431
[22] Filed: Jan. 27, 1984
[30] Foreign Application Priority Data
 Feb. 1, 1983 [JP] Japan .................................. 58-15137
[51] Int. Cl.$^4$ ............................................. G02B 26/10
[52] U.S. Cl. .................................................. 350/3.71
[58] Field of Search ................ 235/457; 350/3.71, 6.2, 350/6.7

[56] References Cited
FOREIGN PATENT DOCUMENTS
 216741 1/1982 Japan .

OTHER PUBLICATIONS
Wyant, J. C., "Rotating Diffraction Grating Laser Beam Scanner", Applied Optics, vol. 14, No. 5, May 1975, pp. 1057-1058.

Primary Examiner—Bruce Y. Arnold
Attorney, Agent, or Firm—Sughrue, Mion, Zinn, Macpeak, and Seas

[57] ABSTRACT

At least one plane diffraction grating is formed on a rotatable plate, and a light beam is made to impinge upon the plane diffraction grating. The first-order diffracted light component and the minus first-order diffracted light component of the light beam diffracted by the plane diffraction grating are reflected by use of many plane reflection surfaces and guided again to the plane diffraction grating so that, after the reflected light beams are diffracted again by the plane diffraction grating, the light beams diffracted again become parallel with the original light beam incident on the plane diffraction grating. The parallel light beams diffracted again are focused by a focusing lens onto a scanning surface, so that the scanning surface is scanned with the focused light spot along a bow-free straight scan line as the rotatable plate is rotated.

8 Claims, 6 Drawing Figures

LIGHT BEAM SCANNING APPARATUS

BACKGROUND OF THE INVENTION

1. Field of the Invention

This invention relates to a light beam scanning apparatus. This invention particularly relates to a light beam scanning apparatus utilizing a diffraction grating, typically a hologram.

2. Description of the Prior Art

As light deflectors used in light beam scanning apparatuses, there have heretofore been known a mechanical light deflector such as a multi-face rotating mirror or a galvanometer mirror, an acousto-optic light deflector utilizing the interaction between ultrasonic waves and light, a holographic light deflector utilizing a moving hologram, and the like. Among these light deflectors, the holographic light deflector is advantageous in that (i) the hologram used as the main component of the light deflector can be easily reproduced in large numbers by a photographic process, a thermocompression bonding process, or the like, (ii) the beam deflected by the holographic light deflector is scarcely affected by any error in the angle of inclination or wobbling of the holographic light deflector, (iii) no focusing lens need be used since the hologram itself can be made to act in the same way as a lens, and (iv) the direction of light deflection can be selected independently of the moving direction of the hologram. Thus the holographic light deflector is expected to be suitable for simplifying the construction of light beam scanning apparatuses and reducing the cost of these apparatuses.

The holographic light deflector is based on the principle that, by changing the position of the hologram plate with respect to a reconstruction beam, the direction of the first-order diffracted component of the reconstructed beam is changed. As forms of the holographic light deflector embodying this principle, there have heretofore been known a form wherein reflection type holograms are positioned on a rotatable (convex or concave) spherical surface in the rotating direction thereof, a form wherein holograms are positioned on the side face of a rotatable cylindrical body or on the side faces of a rotatable prism-like body, a form wherein holograms are positioned on a rotatable disk in the circumferential direction thereof, and the like.

Among the aforesaid forms of the holographic light deflectors, the holographic light deflector wherein reflection type holograms are positioned on a spherical surface and the holographic light deflector wherein holograms are positioned on the side face of a cylindrical body or on the side faces of a prism-like body are advantageous for the construction of a laser scanning apparatus exhibiting a high resolution. This is because, since a holographic reconstruction system which has no aberration is utilized, it is possible to obtain more than 10,000 resolution points per scan. However, in order to realize a holographic light deflector comprising the holograms positioned on the spherical surface or on the cylindrical body, it is necessary to apply a light-sensitive material such as a photographic emulsion, a photoresist or a photopolymer on the spherical surface or on the surface of the cylindrical body. From the technical viewpoint, it is not always possible to accurately apply the light-sensitive material on the spherical surface or on the surface of the cylindrical body. Further, in the holographic light deflector comprising the holograms positioned on the side faces of a prism-like body, though each hologram is fabricated in the form of a flat plate, a high assembling accuracy is required, and there is a limit to increasing of the operation speed due to a large windage loss.

On the other hand, the holographic light deflector comprising the holograms positioned on a disk in the circumferential direction thereof does not exhibit the aforesaid drawbacks since the construction is very simple, and this form of deflector is expected to be most suitable for practical use. To date, however, the only case in which holographic light deflector of this type that has been put into practice is that wherein it is incorporated into a bar code reader so that scan lines can be obtained in various directions from a plurality of holograms constituting the holographic light deflector. That is mainly because, when a scan line is formed on a flat surface, the scan line becomes curved or bowed. This scan line "bow" is inconvenient for recording and readout of document information and image information.

As disclosed, for example, in U.S. Pat. Nos. 4,289,371 and 3,721,486, and Japanese Unexamined Patent publication No. 57(1982)-85018, various attempts have been made to solve the scan line bow problem arising in the holographic light deflector comprising the holograms positioned on a disk in the circumferential direction thereof.

In the method disclosed in U.S. Pat. No. 4,289,371, the diffraction grating is constructed so as to have a $\lambda/d$ ratio wherein $\lambda$ is the wavelength of the reconstruction beam, and d is the period (constant) of the diffraction grating (hologram) of between 1 and 1.618. In this method, however, when the wavelength $\lambda$ of the light beam used for reconstruction is e.g. 0.488 $\mu$m, the period d of the diffraction grating must be between 0.30 $\mu$m and 0.49 $\mu$m. It is not easy to accurately make a diffraction grating (hologram) having such a very short period for the following reasons. First, it is necessary to completely eliminate vibration of the photographic exposure apparatus and sway of ambient air. As is well known by the experts in the art, it is not always possible to accurately expose a recording material to a holographic grating pattern having a very short period within the aforesaid range. Second, it is not always possible to obtain a recording material practically suitable for recording a diffraction grating having a period within the aforesaid range.

In the method disclosed in U.S. Pat. No. 3,721,486, a light beam is diffracted twice by use of two diffraction gratings rotating reversely at an equal speed. However, in order to rotate two diffraction gratings in reverse directions at a speed equal to each other, a complicated rotation transmitting mechanism becomes necessary, and a problem which is technically difficult to solve arises.

In the method disclosed in Japanese Unexamined Patent Publication No. 57(1982)-85018, a light beam is diffracted twice by use of two kinds of diffraction gratings (holograms) rotating synchronously with each other. However, this method requires two kinds of diffraction gratings coupled in predetermined relation to each other, and is complicated.

In general, in the disk-like holographic light deflector, the angle of rotation of the disk and the angle of deflection of the light beam are not proportional to each other. Therefore, when the deflected light beam is focused by a focusing lens to form a light spot and made to scan on a scanning surface, the light spot does not generally move at an equal speed. A method of making the movement speed of the light spot on a scanning surface approximately constant is described by J. C. Wyant, Applied Optics, Vol. 14, No. 5, pp. 1057–1058. In this method, a distortion-free lens is used as the focusing lens to make the movement speed of the light spot on a scanning surface approximately constant. Thus, this method is not a strict one.

SUMMARY OF THE INVENTION

The first object of the present invention is to provide a light beam scanning apparatus using a rotatable plate-like light deflector comprising a diffraction grating, typically a hologram, which forms an essentially bow-free straight scan line on a plane.

The second object of the present invention is, when accomplishing the aforesaid first object, to make it possible to use a diffraction grating having a comparatively long period, and thereby to facilitate fabrication of the diffraction grating.

The third object of the present invention is to eliminate the necessity of using a complicated rotation transmitting mechanism when accomplishing the aforesaid first object.

The fourth object of the present invention is to eliminate the necessity of using two kinds of diffraction gratings and to use only one kind of diffraction grating when accomplishing the aforesaid first object.

The fifth object of the present invention is, by accomplishing the aforesaid second object, to make it possible to use a diffraction grating which can be fabricated also by ruling techniques besides holographic techniques.

The sixth object of the present invention is to make the scanning speed of a light spot on a scanning surface constant to a high accuracy.

The seventh object of the present invention is to improve the performance of the apparatus by accomplishing the aforesaid first object and/or sixth object, and to improve the reliability of the apparatus and reduce the cost of the apparatus by accomplishing the aforesaid second object, third object, fourth object and/or fifth object.

The above objects are accomplished by a light beam scanning apparatus comprising a rotatable plate provided with at least one plane diffraction grating, a light beam source for emitting a light beam incident on said plane diffraction grating, an optical system for reflecting the first-order diffracted light component and the minus first-order diffracted light component of the light beam diffracted by said plane diffraction grating by use of a plurality of plane reflection surfaces and for guiding the reflected light beam of said first-order diffracted light component and the reflected light beam of said minus first-order diffracted light component again to said plane diffraction grating so that, after said reflected light beams are diffracted again by said plane diffraction grating, said light beams diffracted again become parallel with said original light beam incident on said plane diffraction grating, and a focusing lens for focusing said parallel light beams diffracted again by said plane diffraction grating to a light spot on a scanning surface, whereby said scanning surface is scanned with the focused light spot as said rotatable plate is rotated.

A light beam scanning apparatus for accomplishing the same objects as those described above has been proposed, for example, in Japanese Patent Application No. 57(1982)-216741. This light beam scanning apparatus comprises a rotatable plate provided with at least one plane diffraction grating, a light beam source for emitting a light beam incident on said plane diffraction grating so that the plane of incidence is a plane in which the rotation axis of said rotatable plate lies, an optical system for reflecting the light beam diffracted by said plane diffraction grating at least by use of a plane reflection surface normal to said plane of incidence and for guiding said light beam again to said plane diffraction grating, and a focusing lens for focusing the light beam diffracted again by said plane diffraction grating onto a scanning surface, whereby said scanning surface is scanned with the focused light spot as said rotatable plate is rotated.

In the light beam scanning apparatus proposed in Japanese Patent Application No. 57(1982)-216741, normally, either the first-order diffracted light component or the minus first-order diffracted light component of the light beam diffracted by the plane diffraction grating (hologram) is utilized for scanning. On the other hand, in the light beam scanning apparatus of the present invention, both first-order diffracted light component and minus first-order diffracted light component are utilized for scanning.

In the light beam scanning apparatus in accordance with the present invention, the first-order diffracted light component and the minus first-order diffracted light component of the light beam diffracted by the plane diffraction grating provided on the rotatable plate are made to again impinge upon the plane diffraction grating by use of the optical system comprising a plurality of plane reflection surfaces. The diffracted light components again diffracted by the plane diffraction grating are then focused by the focusing lens to a light spot on the scanning surface. Therefore, the efficiency can be markedly improved as compared with the case wherein only the first-order diffracted light component or the minus first-order diffracted light component is used for scanning. Also, it is possible to prevent the scan line formed on the scanning surface by the focusing light spot as the rotatable plate is rotated from becoming curved or bowed. Further, when correcting the scan line bow, it is possible to use a diffraction grating having a comparatively long grating period. Therefore, fabrication of the diffraction grating becomes very easy and can be accomplished by using various techniques. Also, since it is sufficient that a single rotatable plate be rotated, the light beam scanning apparatus of the present invention requires no complicated rotation transmitting mechanism. Furthermore, scan line bow can be easily corrected by use of only a single kind of diffraction grating. Also, in the present invention, it is possible to make the scanning speed of the light spot on the scanning surface constant at a high accuracy. Thus in accordance with the present invention, it is possible to simply and cheaply realize a light beam scanning apparatus exhibiting a high performance and high reliability.

DESCRIPTION OF THE PREFERRED EMBODIMENTS

The present invention will hereinbelow be described in further detail with reference to the accompanying drawings.

Figure 1:
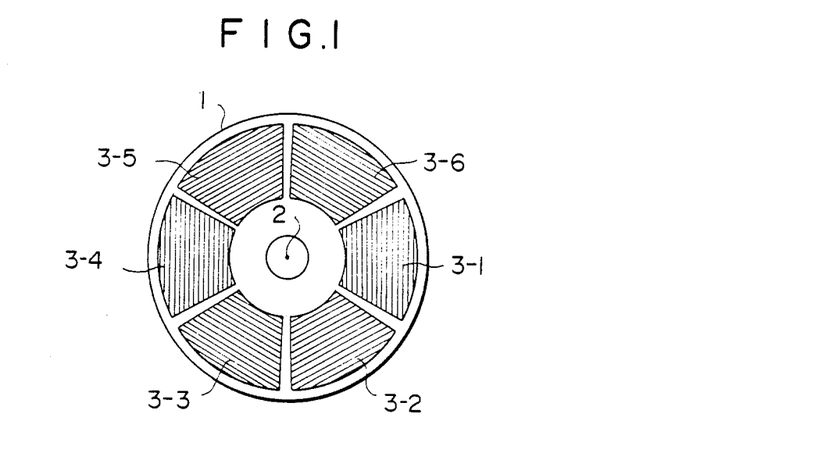
FIG. 1 is a plan view showing an example of the rotatable plate used in the light beam scanning apparatus in accordance with the present invention.

Referring to FIG. 1, a rotatable plate 1 used in the light beam scanning apparatus in accordance with the present invention is provided thereon with a plurality of plane diffraction gratings 3-1, 3-2, ..., 3-6 positioned around a rotation axis 2. The number of the diffraction gratings is not necessarily limited to six, but may be an arbitrary number of one or more. The direction of the grating lines of each diffraction grating should preferably be tangent to the rotating direction of the rotatable plate 1.

Figure 2:
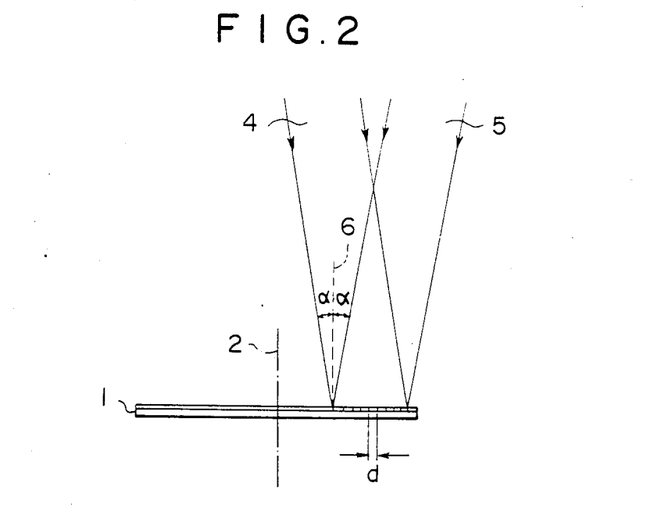
FIG. 2 is a side view showing a method of making the plane diffraction grating used in the light beam scanning apparatus in accordance with the present invention.

The diffraction gratings 3-1, 3-2, ..., 3-6 can be fabricated by various methods. FIG. 2 shows a method of directly fabricating the diffraction gratings by a holographic technique. In FIG. 2, plane waves 4 and 5 which are coherent with respect to each other and which have a wavelength λ are made to impinge upon the rotatable plate 1 provided thereon with a layer of a recording medium. Thus the rotatable plate 1 is exposed a predetermined number of times to interference fringes formed by the interference between the plane waves 4 and 5 via a predetermined mask. The number of exposures is equal to the number of the diffraction gratings to be provided on the rotatable plate 1. For example, when six diffraction gratings are formed on the rotatable plate 1 as shown in FIG. 1, the rotatable plate 1 is exposed six times to the interference fringes. After each exposure is finished, the rotatable plate 1 is rotated by a predetermined angle (60° when six diffraction gratings are provided). After the exposing step is finished as described above, the recording medium on the rotatable plate 1 is subjected to treatment such as development suitable therefor, and the predetermined diffraction gratings are thereby formed on the rotatable plate 1. When the angles of incidence of the plane waves 4 and 5 impinging upon the rotatable plate 1 are equally adjusted to α symmetrically with respect to a line 6 normal to the rotatable plate 1 as shown in FIG. 2, the period d of the grating lines (interference fringes) is expressed by the equation $$d = \lambda/(2 \sin \alpha) \tag{1}$$

By way of example, when the wavelength λ of the plane waves 4 and 5 is 0.488 μm and the angle of incidence α is 14.5°, the grating period d becomes 0.976 λm. The direction of the grating lines (interference fringes) is perpendicular to the plane in which the principal rays of both plane waves 4 and 5 lie (i.e. the plane of the drawing sheet in FIG. 2).

Figure 3:
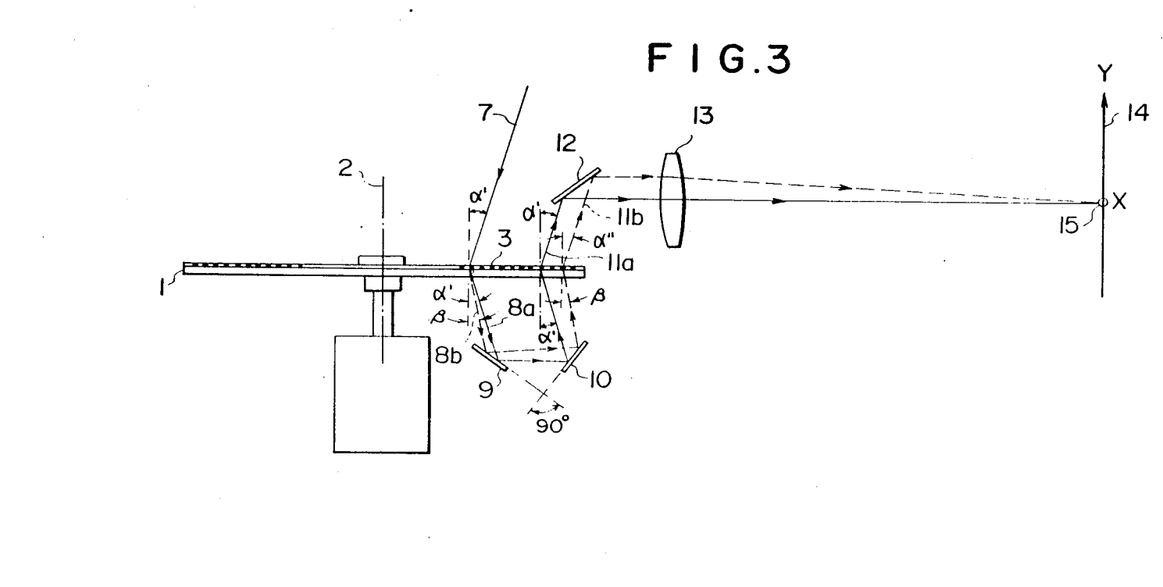
FIG. 3 is a side view showing the principle of the light beam scanning apparatus in accordance with the present invention by an embodiment utilizing only the first-order diffracted light component.

FIG. 3 shows the principle of the light beam scanning apparatus in accordance with the present invention by an embodiment utilizing only the first-order diffracted light component. A collimated light beam 7 having a wavelength λ' is made to impinge upon a diffraction grating 3 provided on the rotatable plate 1 so that the plane of incidence is a plane in which the rotation axis 2 of the rotatable plate 1 lies. That is, in this embodiment, the plane of incidence is defined as the plane in which the rotation axis 2 and the incident light beam 7 lie. In FIG. 3, the plane of the drawing sheet is taken as the plane of incidence to maintain consistency in analysis. In the case wherein the angle of incidence α' of the incident light beam 7 with respect to the rotatable plate 1 is adjusted to the angle determined by the equation $$d = \lambda'/(2 \sin \alpha') \tag{2}$$

wherein d is the grating period of the diffraction grating 3, the angle of diffraction of a light beam 8a generated by diffraction when the direction of the grating lines is normal to the plane of incidence (i.e. the drawing sheet in FIG. 3) becomes equal to α', and the light beam 8a also lies in the plane of incidence. However, when the direction of the grating lines is deviated from the direction normal to the plane of incidence as the rotatable plate 1 is rotated, a light beam 8b generated by diffraction in this condition does not lie in the plane of incidence but has a component normal to the plane of incidence. This means that the light beam 8b is deflected at an angle with respect to the plane of incidence. Also, the angle of projection β of the light beam 8b on the plane of incidence is changed as the direction of the grating lines is deviated from the direction normal to the plane of incidence, and becomes different from α'. Consequently, the scan line of the light beam on a scanning surface is deviated from a straight line and becomes curved or bowed. In this embodiment, in order to minimize or eliminate the scan line bow on the scanning surface, the light beam once diffracted by the diffraction grating is guided again to the diffraction grating, thereby again diffracting the light beam. In the embodiment of FIG. 3 utilizing only the first-order diffracted light component, the light beams 8a and 8b are guided again to the diffraction grating 3 by use of plane reflection surfaces 9 and 10 normal to the plane of incidence. The plane reflection surfaces 9 and 10 should preferably be positioned so that they are perpendicular to each other. In this case, also when the light beam 8a is guided again to the diffraction grating 3, the light beam 8a lies in the aforesaid plane of incidence (i.e. the plane of the drawing sheet in FIG. 3), and the angle of re-incidence of the light beam 8a is equal to α'. Therefore, the angle of diffraction of a light beam 11a generated by being again diffracted by the diffraction grating 3 is also equal to α'. On the other hand, when the light beam 8b is guided again to the diffraction grating 3, the angle of projection of the light beam 8b on the plane of incidence is equal to β. When the light beam 8b is then diffracted again by the diffraction grating 3 to generate a light beam 11b, the angle of projection α" of the light beam 11b on the plane of incidence takes a value extremely close to α'. This means that, when the light beams 11a and 11b are focused by a focusing lens 13 onto a scanning surface 14, a light spot is formed at approximately the same position 15 with respect to the Y direction, and therefore the scan line bow is markedly relieved or eliminated.

Figure 6:
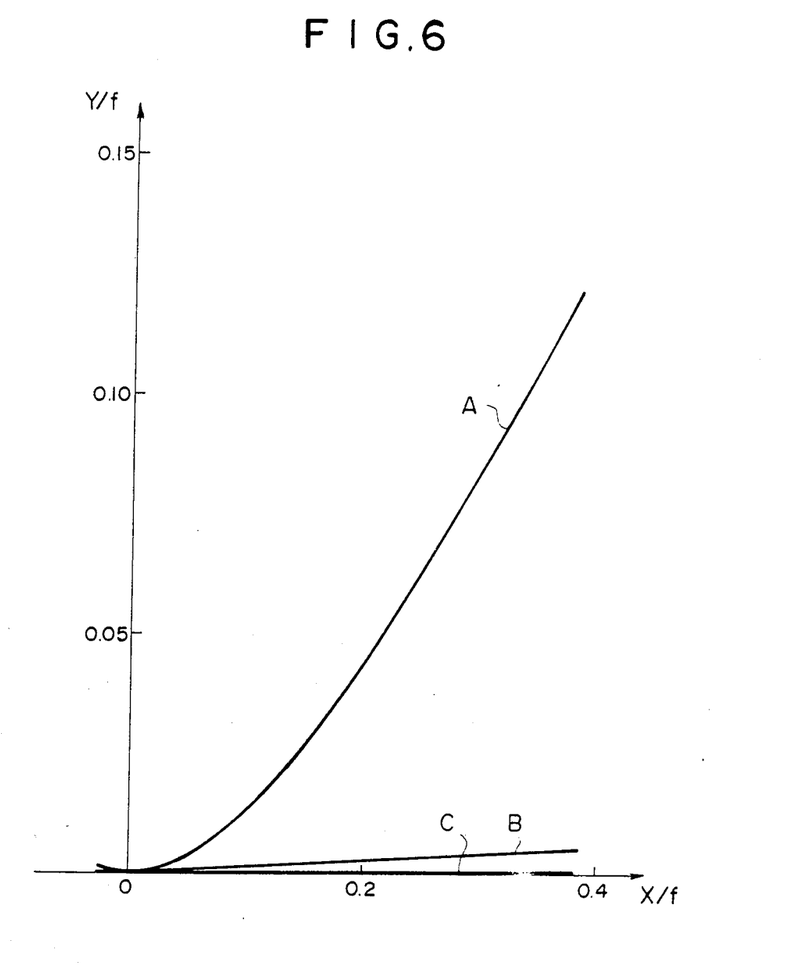
FIG. 6 is an explanatory graph showing the effect of the light beam scanning apparatus in accordance with the present invention on correction of the scan line bow.

The effect of the above-described embodiment utilizing only the first-order diffracted light component will hereinafter be described with reference to FIG. 6. When the grating period d of the diffraction grating 3 is e.g. 1.4 λm and the wavelength λ' of the light beam used for scanning is e.g. 0.488 λm, then the angle of incidence α' of the incident light beam 7 is adjusted to 10° according to aforesaid Equation (2). As the focusing lens 13, an fθ lens which is prepared so as to form a light spot proportional to the angle of incidence of the light beam incident on the fθ lens is used. In this manner, the locus of the scan line drawn by the light spot on the scanning surface 14 is measured. When the predetermined scanning direction on the scanning surface 14 is taken as the X coordinate axis, the direction normal to the scanning direction is taken as the Y coordinate axis, and these coordinates are normalized with the focal length f of the focusing lens 13 (fθ lens), the locus of the scan line drawn on the scanning surface 14 becomes as indicated by the curve B in FIG. 6. On the other hand, when the light beams 8a and 8b once diffracted by the diffraction grating 3 are directly focused by the focusing lens 13 onto the scanning surface 14 according to the conventional procedure, the locus of the scan line drawn on the scanning surface 14 becomes as indicated by the curve A in FIG. 6. From the curves A and B, it will be understood that the degree of the scan line bow is markedly reduced in the embodiment of FIG. 3.

In the embodiment of FIG. 3, when the angle of incidence α' of the light beam 7 incident on the diffraction grating 3 is adjusted to 0°, a better effect is obtained. Namely, in this case, the locus of the scan line drawn on the scanning surface 14 becomes straight as indicated by the curve C in FIG. 6, and no scan line bow arises.

In the embodiment of FIG. 3, the light beams 8a and 8b are guided again to the diffraction grating 3 by use of the plane reflection surfaces 9 and 10 positioned perpendicularly to each other. However, the two plane reflection surfaces need not necessarily be positioned perpendicularly to each other. Thus the plane reflection surfaces may be positioned in any manner insofar as the difference between the angles of projection of the light beams 8a and 8b on the plane of incidence when the light beams 8a and 8b are generated by the first diffraction is reproduced as the difference between the angles of projection of the light beams 8a and 8b on the plane of incidence when these beams are guided again to the diffraction grating 3. Further, the number of the plane reflection surfaces is not limited to two. Also, as the plane reflection surfaces, it is possible to use optical glass plates comprising substrates and reflection films laid on the front or rear surfaces thereof, total reflection sides of prisms, and the like.

In the above-described embodiment, the minus first-order diffracted light component can also be guided again to the plane diffraction grating by approximately the same optical system as that for the first-order diffracted light component, and then focused onto the scanning surface by the fθ lens to form a bow-free straight scan line as in the case of the first-order diffracted light component.

Accordingly, when the light spot formed on the scanning surface by the first-order diffracted light component and the light spot formed thereon by the minus first-order diffracted light component are made to coincide with each other, it becomes possible to obtain a bow-free straight scan line at an improved efficiency as the rotatable plate is rotated.

Figure 4:
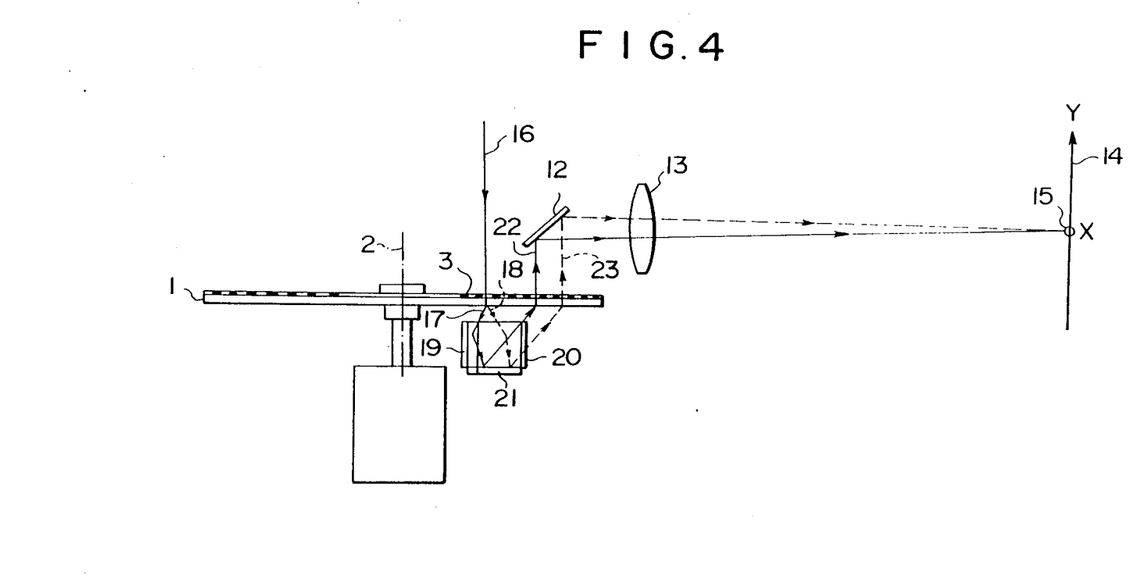
FIG. 4 is a side view showing an embodiment of the light beam scanning apparatus in accordance with the present invention.

FIG. 4 shows an embodiment of the light beam scanning apparatus in accordance with the present invention wherein the first-order diffracted light component and the minus first-order diffracted light component of the light beam diffracted by the plane diffraction grating are guided again to the plane diffraction grating by use of three plane reflection mirrors, diffracted again by the plane diffraction grating, and then focused to the same point on the scanning surface.

In FIG. 4, a collimated light beam 16 impinges upon the plane diffraction grating 3 provided on the rotatable plate 1. The light beam 16 is diffracted by the plane diffraction grating 3, and generates a first-order diffracted light component 17, a minus first-order diffracted light component 18 which extends in the direction of the grating lines of the plane diffraction grating 3 and which is in symmetric relation to the first-order diffracted light component 17 with respect to the plane including the light beam 16, and the like. In this embodiment, both first-order diffracted light component 17 and minus first-order diffracted light component 18 are utilized for scanning. The first-order diffracted light component 17 is reflected by plane reflection mirrors 19 and 21 onto the plane diffraction grating 3, and diffracted again by the plane diffraction grating 3 to form a light beam 22. On the other hand, the minus first-order diffracted light component 18 is reflected by plane reflection mirrors 20 and 21 onto the plane diffraction grating 3, and diffracted again by the plane diffraction grating 3 to form a light beam 23. The plane reflection mirrors 19, 20 and 21 should be positioned so that the first-order diffracted light component 17 and the minus first-order diffracted light component 18 are reflected by the predetermined reflection mirrors. Further, as shown in FIG. 4, the plane reflection mirrors 19, 20 and 21 should preferably be positioned perpendicularly to one another. After the first-order diffracted light component 17 and the minus first-order diffracted light component 18, are reflected they become parallel with each other. Accordingly, the light beams 22 and 23 also become parallel with each other. This means that, when the light beams 22 and 23 are focused by the focusing lens 13 onto the scanning surface 14, the light spots 15 formed by the light beams 22 and 23 coincide with each other. Thus it is possible to obtain the scan line at an improved efficiency. Further, as described above with reference to FIG. 3, the light beams 22 and 23 respectively form straight scan lines as the rotatable plate 1 is rotated. Therefore, the light spot 15 at which the light beams 22 and 23 are superposed one upon the other depicts a bow-free straight scan line.

Figure 5:
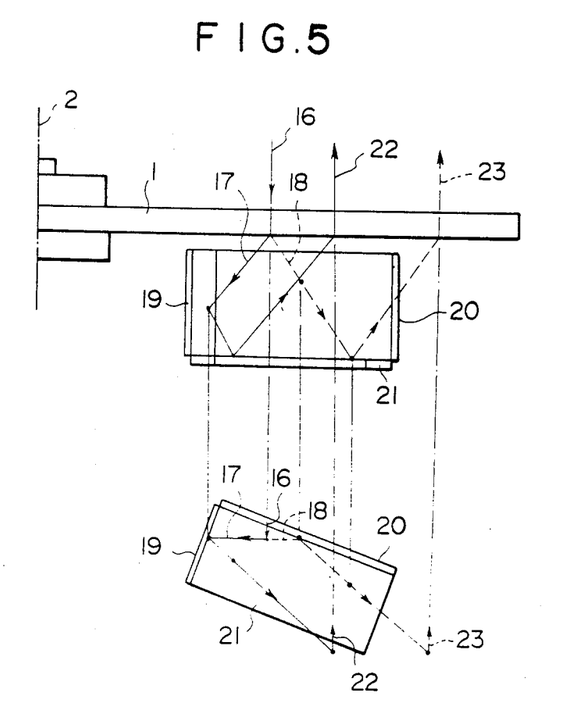
FIG. 5 is an enlarged view showing a part of the light beam scanning apparatus shown in FIG. 4.

FIG. 5 is an enlarged view showing the loci of the diffracted light beams in the vicinities of the plane reflection mirrors in the embodiment of FIG. 4. For easiness of understanding, FIG. 5 also includes a part of an elevational view based on the orthogonal projection drawing method.

In the above-described embodiment of FIG. 4, the first-order diffracted light component 17 and the minus first-order diffracted light component 18 are guided again to the plane diffraction grating 3 by use of the plane reflection mirrors 19, 20 and 21 the reflection surfaces of which are perpendicular to one another. However, the number of the plane reflection surfaces is not limited to three. In short, it is sufficient that the plane reflection surfaces are composed so that the light beams 22 and 23 after being diffracted again are parallel to each other and, at the same time, parallel to the plane of incidence in which the rotation axis of the rotatable plate 1 lies.

Also, in the embodiment of FIG. 4, the plane reflection mirror 20 is inclined with respect to the plane of incidence so that the first-order diffracted light component 17 and the minus first-order diffracted light component 18 are reflected by the predetermined reflection mirrors. However, the same effect can be obtained also by inclining the direction of the grating lines of the plane diffraction grating 3 at an angle with respect to the tangential direction of the rotatable plate 1.

In the above-described embodiments of the present invention, the diffraction grating can be fabricated not only by a method of directly applying the holographic techniques but also by a method of photographically duplicating the holograms or preparing replicas by use of a master hologram, a method of applying ruling techniques, a method of preparing replicas by use of a master grating fabricated by ruling techniques, and the like.

Further, the rotatable plate provided with the diffraction grating need not necessarily be circular but may for example be polygonal.

I claim:

1. A light beam scanning apparatus comprising a rotatable plate provided with at least one plane diffraction grating, a light, beam source for emitting a light beam incident on said plane diffraction grating so as to define a plane of incidence, an optical system for reflecting the first-order diffracted light component and the minus first-order diffracted light component of the light beam diffracted by said plane diffraction grating by use of a plurality of plane reflection surfaces and for guiding the reflected light beam of said first-order diffracted light component and the reflected light beam of said minus first-order diffracted light component again to said plane diffraction grating so that, after said reflected light beams are diffracted again by said plane diffraction grating, said light beams diffracted again become parallel with said original light beam incident on said plane diffraction grating, and a focusing lens for focusing said parallel light beams diffracted again by said plane diffraction grating to a light spot on a scanning surface, whereby said scanning surface is scanned with the focused light spot as said rotatable plate is rotated.

2. An apparatus as defined in claim 1 wherein the direction of the grating lines of said plane diffraction grating is tangent to the rotating direction of said rotatable plate.

3. An apparatus as defined in claim 1 wherein said optical system for reflecting and guiding said light beam again to said plane diffraction grating comprises two plane reflection surfaces normal to said plane of incidence.

4. An apparatus as defined in claim 3 wherein said two plane reflection surfaces are positioned perpendicularly to each other.

5. An apparatus as defined in any of claims 1 to 4 wherein the angle of incidence of said light beam incident on said plane diffraction grating is 0°.

6. An apparatus as defined in claim 1 wherein said optical system for reflecting and guiding said light beam again to said plane diffraction grating comprises three plane reflection surfaces.

7. An apparatus as defined in claim 6 wherein said three plane reflection surfaces are positioned perpendicularly to each other.

8. An apparatus as defined in claim 7 wherein at least one of said three plane reflection surfaces is inclined at other than 90 degrees with respect to said plane of incidence.

* * * * *